United States Patent [19]
Lindstrom

[11] 3,801,376
[45] Apr. 2, 1974

[54] AUXILIARY ELECTROLYTE SYSTEM
[75] Inventor: Olle B. Lindstrom, Taby, Sweden
[73] Assignee: Svenska Utrecklingsaktibolaget, Stockholm, Sweden
[22] Filed: Aug. 16, 1971
[21] Appl. No.: 172,098

[52] U.S. Cl. .............................................. 136/160
[51] Int. Cl. .......................................... H01m 11/00
[58] Field of Search ........... 136/159, 160, 161, 162, 136/163, 86 E, 86 R

[56] References Cited
UNITED STATES PATENTS

| 1,467,707 | 9/1923 | Cook | 136/159 |
| 2,921,110 | 1/1960 | Crowley et al. | 136/160 |
| 3,257,241 | 6/1966 | Timminen | 136/160 |
| 3,291,889 | 12/1966 | Aline et al. | 136/86 A |

Primary Examiner—A. B. Curtis
Assistant Examiner—H. A. Feeley
Attorney, Agent, or Firm—Burns, Doane, Swecker & Mathis

[57] ABSTRACT

An auxiliary electrolyte system for an electrical current battery such as metal air batteries, fuel cells, lead, alkali and other similar batteries having liquid electrolytes. The electrolyte is circulated through the battery with the help of a pump which has its input connected to a reservoir and the electrolyte expelled from the battery is returned to the electrolyte reservoir mainly by gravity flow. The container for the outside electrolyte also serves as a container or housing for the battery cells or electrode piles which may be either above the upper surface of the electrolyte or partially submerged.

10 Claims, 8 Drawing Figures

INVENTOR
OLLE B. LINDSTROM

BY Burns Doane Swecker & Mathis
ATTORNEYS

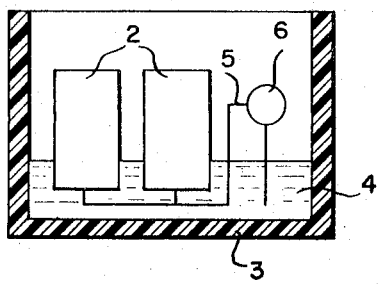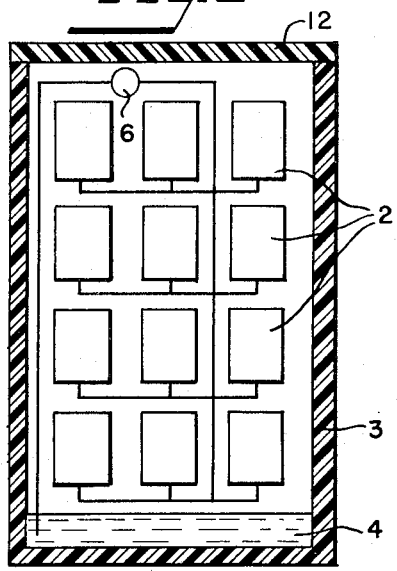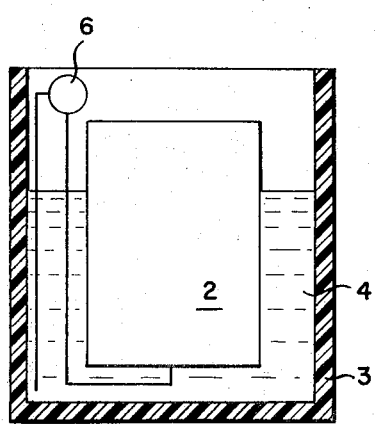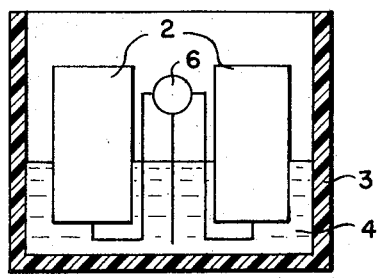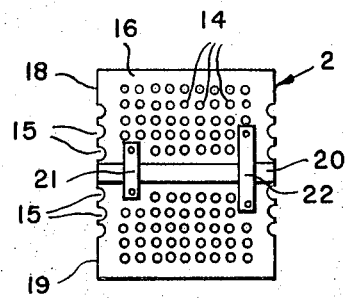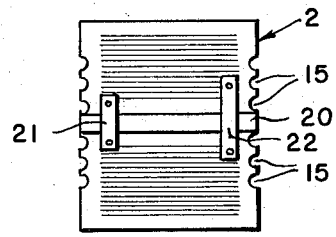

AUXILIARY ELECTROLYTE SYSTEM

This invention relates to electrochemical batteries having an auxiliary system for circulating a liquid electrolyte in batteries.

The good performance which has been shown by several of the new sources of current, such as metal air batteries, fuel batteries, and improved versions of the traditional batteries, particularly lead and alkali batteries, has its basis not only in more effective electrode material with better structure and higher activity, but also in improved electrolyte systems. Such improved electrolyte systems normally involve circulation of the electrolyte to thereby provide a number of advantages, among these being for better control of the terminal conditions in the batteries, the possibility for continual filtering and replenishing of the electrolyte, an equalization of difference in concentration, and control of the electrolyte level.

In the past, the electrolyte has been circulated through the electrolyte space of the battery with the help of an electrolyte pump. The system required for circulation of the electrolyte, which is considered as an electrolyte auxiliary system, contains other electrolyte carrying parts of the battery than the spaces between the electrodes, and includes the container for the electrolyte, circulation pump, heat exchanger, equipment for process control, level gauge, etc. Such auxiliary systems were initially developed for fuel batteries and metal air batteries, but in recent times have also been used in improved versions of the traditional accumulators, particularly bipolar lead-acid batteries and bipolar alkali accumulators. In this latter case, the principal factor contributing to a higher performance is equalization of concentration in the electrolyte layer next to the electrodes. By storing a portion of the electrolyte in a special electrolyte container, the electrodes can be placed closer to each other, which feature can be used advantageously in lead-acid batteries.

An important practical aspect in regard to larger batteries consisting of many cells is that necessary controls for the constituency of the electrolyte are facilitated by the use of an auxiliary circulation system, in that measuring can be done at one point in the auxiliary electrolyte system instead of in each cell. This has a great importance, for example, with batteries for electrical vehicles. As is known, in batteries for traction vehicles, each cell vessel has an inspection hole for determining the liquid level in the cell, for sampling the electrolyte and for adding liquid when required. This inspection process is time-consuming for large batteries with many cells. This practical aspect is, of course, of equal importance even for the new power sources such as fuel batteries and metal air batteries.

Auxiliary electrolyte circulation systems require electrolyte connections between the different cell containers. If the cells are at different electrical potentials, there will be electrical current leakage through the electrolyte connections. Leakage, which consequently represents a continual internal burden, contributes to a self-discharge and decreases the level of battery performance. One technique used previously to keep current leakage down was to reduce the area and to increase the length of the electrolyte piping connections between electrolyte spaces of different electrical potential. Another such technique has been to make temporary interruptions in the electrolyte connections by injecting gas into the liquid electrolyte flow, as by mechanical drop-formers which break up the liquid electrolyte flow or by intermittently operating closing vents.

In terms of design, the auxiliary electrolyte system has become quite complex as a result of the problems associated with the proper control of the electrolyte constituency and the electrical leakage. Batteries with special auxiliary electrolyte systems consequently often required a higher volume per cell unit, gave lower operation reliability, and were more expensive to build than conventional batteries without special auxiliary systems. Such disadvantages were the price which had to be paid for the advantage of better utilization of electrode material, higher effective electrical current withdrawal, higher permissible temperature, and more simple supervision.

It is an object of the present invention to provide a novel auxiliary electrolyte system which gives a surprisingly simple solution to the problems mentioned above without sacrificing the enumerated advantages of the auxiliary electrolyte system.

Another object is to provide a new manner of arranging the electrolyte particularly in batteries having the electrodes of a cell constructed in the form of a pile with at least two cells connected electrically in series and inside electrolyte spaces between the electrodes being connected with outside electrolyte containing devices in such way that the electrolyte circulates between the outside and inside electrolyte spaces by means of tubelines, channels, and other connecting devices limiting electrical current leakage.

A further object is to provide a novel auxiliary electrolyte system for use with a battery having at least two cells connected electrically in series and characterized by the fact that the battery pile with its inside electrolyte space is in its turn arranged in the same housing which serves as the container providing the electrolyte space.

Still another object is to provide in an electrochemical battery an improved auxiliary liquid electrolyte system which is charactized by having a container for the common reservoir of electroltye that is located beneath the electrodes to collect by gravity flow from the structures serving as the electrodes the electrolyte which is leaked or expelled from the inside electrode spaces. While advantages accrue from having the electrodes above the electrolyte surface in the reservoir, it is also contemplated that the electrodes may be partially submerged in the electrolyte reservoir.

Other objects and advantages will become apparent from the claims from the description as it proceeds in connection with the accompanying drawings wherein:

FIGS. 3 and 4 are diagrammatic showings of other embodiments of a battery and auxiliary electrolyte system in accord with the present invention where the piles are partially sunk or submerged in the outer electrolyte;

FIG. 5 is a view in elevation showing diagrammatically a group of piles arranged in columns and rows all within a large container which also serves as a reservoir for the outside electrolyte;

FIG. 6 is a view similar to that of FIG. 3;

FIG. 7 is a diagrammatic plan view of a cell or pile as illustrated in FIGS. 3–6 with no upper cover member; and FIG. 8 is a view similar to FIG. 7 showing a perforated cover.

Figure 1:
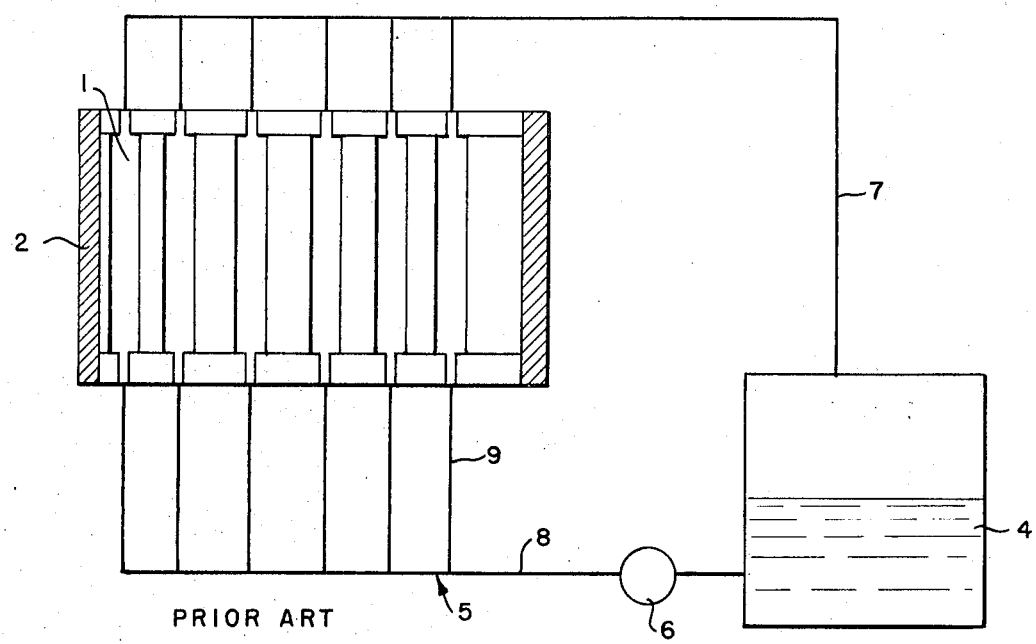
FIG. 1 is a diagrammatic view of a typical prior art battery and auxiliary electrolyte system.

With reference to the drawings, FIG. 1 shows a prior art technique where a battery pile 2 having an inner electrolyte space 1 is connected to be in fluid communication with an auxiliary electrolyte container 3 containing a liquid electrolyte 4. Each battery pile 2 normally consists of two or preferably more electrodes with each electrode usually being comprised of a plurality of separated plates. The inside space between the individual adjacent plates of each electrode is adapted to be filled with the liquid electrolyte. The liquid electrolyte 4 is circulated into the battery by means of a circulation pump 6 through inlet channel 5 which may comprise pipes of an electrolyte resistant insulating material and is removed through an outlet channel 7 of a similar pipe material.

Inlet channel 5 may consist of a main channel 8 with secondary branch channels 9 which later unite at one end with the main channel 8 and at the other end with the inside electrolyte spaces 1. The inlet channel 5 may be arranged within or outside the battery pile or in a combination arrangement, for example, with the main channel 8 lying outside the battery piles with connections to secondary channel 9 arranged as elements in a battery pile. Electrolyte is pumped through channels 8 and 9 into the inside electrolyte spaces between the electrodes and forced upwardly into channel 7 and thereafter returned to container 3.

Figure 2:
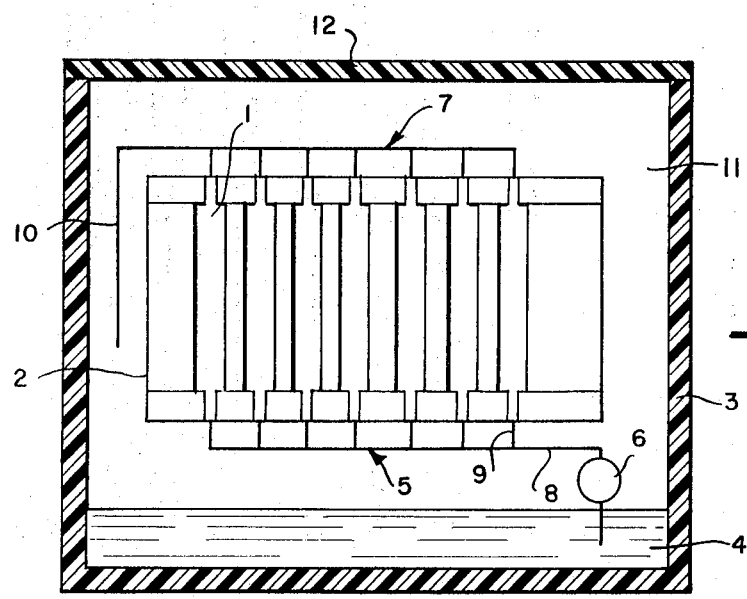
FIG. 2 is a view similar to FIG. 1 but of a battery and auxiliary electrolyte system embodying the present invention.

FIG. 2 is a drawing of a system similar to that described in connection with FIG. 1, but embodies the present invention. The electrode pile 2, which may be a rigid assembly of electrode plates held together in a conventional manner and mounted to inter-cell connectors or terminals (not shown) has inside electrolyte spaces 1 which are between the electrodes. The pile 2 is disposed within an inner chamber defined by the container 3. A common reservoir of electrolyte 4 is carried within this chamber. The electrolyte is forced upwardly through auxiliary channels 9 and through inside electrolyte spaces 1 by means of pump 6. The electrolyte is forced outwardly from the top of the electrode pile 2 and into channel 7 which discharges by gravity through channel 10.

The system as illustrated in FIG. 2 is characterized by, among other things, the outlet channel 10 which returns the electrolyte from the inner electrolyte space 1 being above the upper surface level which the electrolyte pool has in the outer electrolyte space 4. An electrolyte upper surface level that is beneath the electrodes in pile 2 allows for good contact between the outpouring electrolyte and the gas space 11 in the cell container 3, which can be used, for example, for cooling and/or removing reaction water in hydrogen air batteries. Another advantage of a low electrolye level in the container 3 is that the battery system can be tilted without the outer electrolyte reaching up to the upper edge of container 3 or to the battery cover 12 and there making contact with, for example, tracks, terminals, etc. (not shown) which are advantageously placed on the topside of the pile 2. Gas in the electrolyte as a result of gas formation on the electrodes or by gas leakage through gas diffusion electrodes, such as air, oxygen, or hydrogen gas electrodes, can often lead to a blocking of the outlet leads for electrolyte, particularly in larger batteries. This may result in serious operational disturbances with gas-filled electrolyte spaces. The present invention with free electrolyte outlets obviously eliminates disturbances of this kind in a very effective and simple manner.

The dimensioning of the main channels 8 and the secondary channels 9 in the arrangements according to FIGS. 2–6 takes place in the known manner, so that electrolyte leakage is kept at an acceptable level without a loss in pressure and without the working of the pump being overloaded. The invention provides a surprising and a very significant simplification of this connection problem in that the outlet lead 7 with its main channel and secondary channels can be advantageously eliminated, as illustrated in FIGS. 7 and 8. The electrolyte in the inside electrolyte spaces may, as illustrated in FIG. 7, pass via openings or ports 14 in a thin cover member 16 extending from the upper part of the inside electrolyte space. The expelled electrolyte can then run as film, rivulets, or in the form of drops on the outside of the piles 2 or casings therefore, to unite with the electrolyte in the reservoir 4 in container 3.

The outer surfaces of the piles 2, or casings therefore, are preferably provided with suitable grooves 15 to separate the electrolyte flow from the different inner electrolyte spaces. In FIG. 7, two cells 18 and 19 are illustrated which have a common dividing wall at 20. The ridge 20 on the side walls separates the electrolyte expelled from the top of one pile from the electrolyte expelled from the top of another pile. Where the piles are connected electrically in series as by straps 21 and 22, the electrolyte from each cell is kept separate until it unites with reservoir 4.

This is a particularly suitable way in which the invention provides several important advantages. Electrical current leakage can be kept down where the piles 2 are connected electrically in series without recourse to area and length limitations of discharge canals, as illustrated in the embodiment of FIG. 2, which require greater pump pressures. As a result, there is greater freedom in dimensioning the intake canals for the lower electrical leakage, and a more equal electrolyte distribution between the different electrolyte spaces in the battery piles 2. Also, less pumping power is required as compared with the arrangement according to FIG. 2.

It is also possible to use a free outlet at the electrolyte space's upper part as illustrated in FIG. 8, rather than to use a cover 16 with ports 14 as shown in FIG. 7. The structure of FIG. 8 provides a spillway for expulsion of the electrolyte. This technique is particularly advantageous in the charging of metal air batteries, in that the oxygen which has formed is therby quickly separated from the electrolyte.

Electrical current leakage occurs in the connections between electrodes where the difference in potential exceeds the open circuit voltage of a cell unit. Such leakage consequently takes place only with two or more cells connected electrically in series. As is apparent, the invention has particular benefit with batteries consisting of at least two cells connected in series, with a common outside electrolyte but with inside electrolyte spaces at different electrical potentials, since leakage-limiting connections are essential in this situation.

Another characteristic of the present invention is that, if the battery cell is punctured with electrolyte leakage as a result, the leaked electrolyte will unite with the outside electrolyte in the container under all practical operating conditions. A very great advantage of the invention is obviously that battery pile or cell 2 does not have to be completely liquid-tight; minor leakage of electrolyte through the sealing surfaces at the input connections to the pile or cell 2 are collected in the container and in this manner are returned to the electrolyte reservoir. Because of this advantage, one does not have to undertake difficult welding or use a sealing construction of the battery pile with O-rings, which has a great economic significance.

Referring now to FIG. 3, an arrangement is illustrated where two piles or cells 2 are suitably supported inside the chamber defined by the container 3 which holds the reservoir 4 of the electrolyte. Pump 6 may be any suitable pump of known type which, in the case of piles 2 being connected electrically in series, will provide electrical isolation between the piles 2 by interjecting air bubbles in the channels 5 which lead to inlet ports at the bottoms of piles 2. The tops of piles 2 may be open as illustrated in FIG. 8 or have outlet ports as illustrated in FIG. 7, and the expelled electrolyte allowed to run along the outside surfaces of the piles 2 under the influence of gravity to unite with the electrolyte in the common reservoir 4.

As is evident from the embodiments illustrated in FIGS. 3, 4, and 6, a battery pile 2 may be sunken or submerged to a larger or smaller degree in the electrolyte reservoir 4 in the container 3. The circulation between the inner and outer electrolyte spaces can be easily accomplished as by injecting gas into the inner electrolyte space 1 to utilize the airlift effect. In the case where there is only one cell or pile 2, see FIG. 4, or if the piles 2 are connected electrically in parallel, a pump 6 may be placed in the inlet canal 5 and electrolyte forced upwardly through the piles or cells 2.

With reference to FIG. 5, several piles 2 are disposed in a common cell container 3 side by side and run over each other on different levels or decks. The electrolyte pump 6 and apparatus for cooling, controlling, etc. of the electrolyte may be outside or inside the cell container 3. If inside the container 3, these components may be placed in a special system box, for example, in the upper portion of the cell container, or they can be mounted on the underside of cover 12 as illustrated. The cells or piles 2 may be connected electrically together in series, in parallel or part in parallel and parts in series all as is well known in the art.

Although the invention has been described with preferred embodiments, it is to be understood that variations and modifications may be resorted to as will be apparent to those skilled in the art. Such variations and modifications are to be considered within the purview and scope of the claims appended thereto.

I claim:

1. An electrochemical battery comprising:
a container defining an inner chamber;
a plurality of cells defined by casing means disposed within said chamber, at least some of said cells being electrically interconnected in series to produce a battery voltage which is higher than the voltage of a single cell;
the casing means of each cell having bottom and side wall means defining an inner space for the reception of an electrolyte;
each cell including electrodes disposed within said inner space, and
the casing means of each cell including opening means disposed at the top of the cell communicating the inner space with said chamber;
a common reservoir of electrolyte carried within said chamber;
the opening means at the top of each cell being disposed above the level of electrolyte of said common reservoir;
means connected to said chamber for pumping electrolyte
into a lower portion of each cell from said reservoir,
upwardly through the inside space of each cell and between said electrodes,
through said opening means into said chamber, and into a downward gravitational flow along an outer surface of each cell, toward said common reservoir;
wall means disposed across the tops of adjacent cells which are at different potentials to maintain the electrolyte expelled therefrom separate; and means for maintaining the electrolyte expelled from the top of one cell and flowing down the outer surface thereof separate from the electrolyte expelled from the top of an adjacent cell and flowing downwardly along the outer surface thereof.

2. An electrochemical battery according to claim 1 wherein said opening means comprises a plurality of recesses at the top of each cell communicating the inside space with said chamber.

3. An electrochemical battery according to claim 1 wherein each cell is substantially completely open at its top.

4. An electrochemical battery as defined in claim 1 wherein the lowest part of the cells is immersed in the electrolyte in said common reservoir.

5. An electrochemical battery as defined in claim 1 wherein said battery comprises a first group of cells positioned at a first distance above the upper surface level of the electrolyte in said common reservoir and a second group of cells positioned above said first group of cells to be at a second distance greater than said first distance above the upper surface level of the electrolyte in said reservoir.

6. An electrochemical battery as defined in claim 1 wherein said battery comprises a first group of cells positioned at a first distance above the upper surface level of the electrolyte in said common reservoir and a second group of cells positioned above said first group of cells to be at a second distance greater than said first distance above the upper surface level of the electrolyte in said reservoir.

7. An electrochemical battery comprising:
a container defining an inner chamber;
a plurality of cells defined by casing means disposed within said chamber, at least some of said cells being electrically interconnected in series to produce a battery voltage which is higher than the voltage of a single cell;

the casing means of each cell having bottom and side wall means defining an inner space for the reception of an electrolyte;

each cell including electrodes disposed within said inner space, and the casing means of each cell including opening means disposed at the top of the cell communicating the inner space with said chamber;

a common reservoir of electrolyte carried within said chamber;

the opening means at the top of each cell being disposed above the level of electrolyte of said common reservoir;

means connected to said chamber for pumping electrolyte
into a lower portion of each cell from said reservoir,
upwardly through the inside space of each cell and between said electrodes,
through said opening means and into said chamber, and
into a downward gravitational flow along an outer surface of each cell, toward said common reservoir, wall means disposed across the tops of adjacent cells which are at different potentials to maintain the electrolyte expelled therefrom separate; and channel means formed in an outer side wall surface of each cell casing for maintaining the electrolyte expelled from the top of one cell and flowing down the outer surface thereof separate from the electrolyte expelled from the top of an adjacent cell and flowing downwardly along the outer surface thereof.

8. An electrochemical battery according to claim 7 wherein said opening means comprises a plurality of recesses at the top of each cell communicating the inside space with said chamber.

9. An electochemical battery according to claim 7 wherein each cell is substantially completely open at its top.

10. An electochemical battery as defined in claim 7 wherein the lowest part of the cells is immersed in the electrolyte in said common reservoir.

* * * * *